No. 864,463. PATENTED AUG. 27, 1907.
E. HABER.
ROTARY CUTTER HEAD.
APPLICATION FILED NOV. 1, 1905.

2 SHEETS—SHEET 1.

Witnesses
C. H. Walker.
L. E. Witham.

Inventor
Eugene Haber
By Alexander & Dowell
Attorneys

No. 864,463. PATENTED AUG. 27, 1907.
E. HABER.
ROTARY CUTTER HEAD.
APPLICATION FILED NOV. 1, 1905.
2 SHEETS—SHEET 2
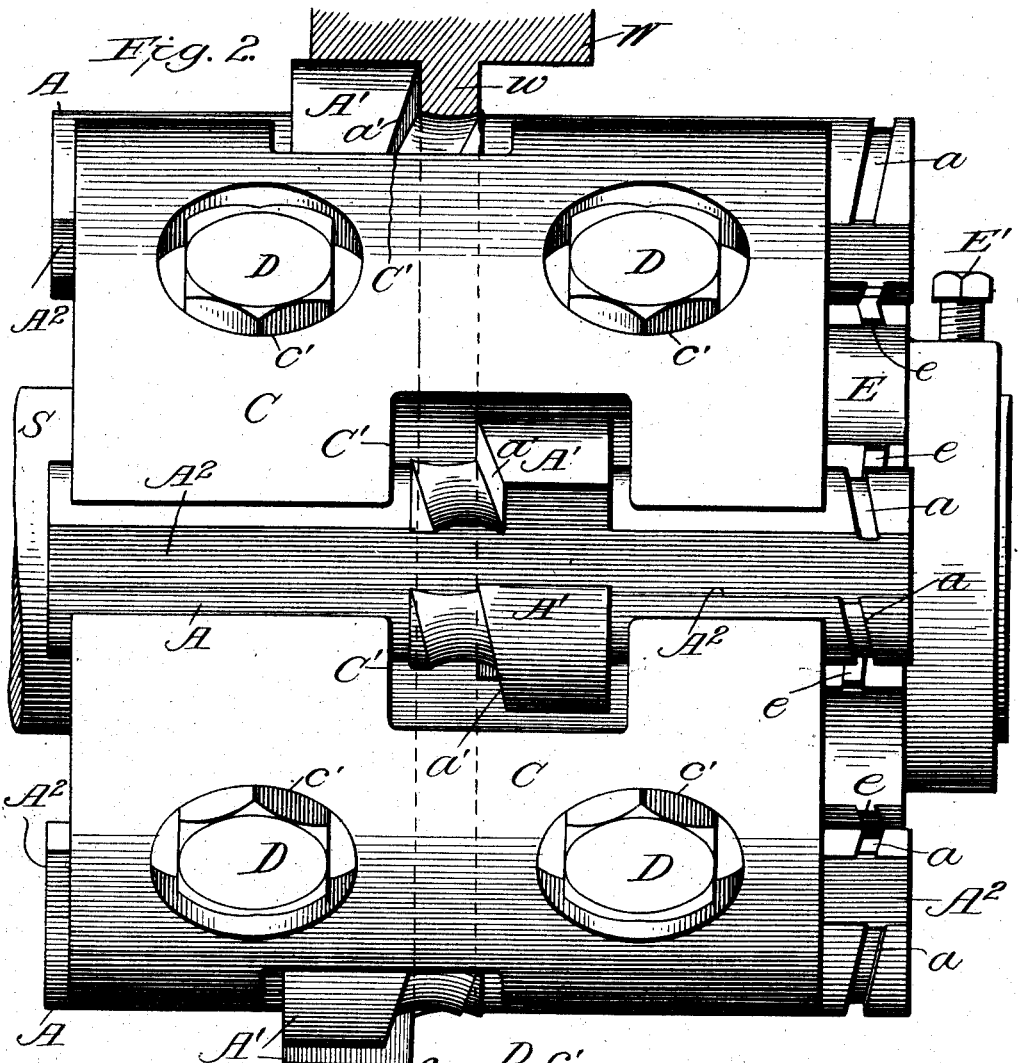
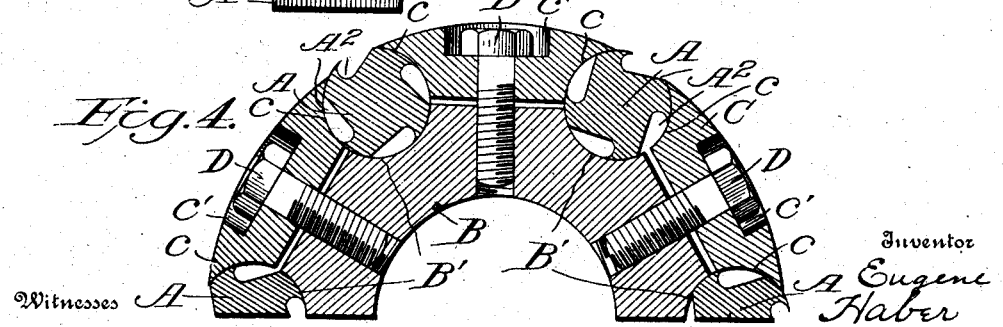
Witnesses
C. H. Walker
L. E. Witham
Inventor
A. Eugene Haber
By Alexander & Powell
Attorneys

UNITED STATES PATENT OFFICE.

EUGENE HABER, OF SOUTH BOSTON, MASSACHUSETTS, ASSIGNOR TO MORSE TWIST DRILL AND MACHINE COMPANY, OF NEW BEDFORD, MASSACHUSETTS.

ROTARY CUTTER-HEAD.

No. 864,463.      Specification of Letters Patent.      Patented Aug. 27, 1907.

Application filed November 1, 1905. Serial No. 285,467.

*To all whom it may concern:*

Be it known that I, EUGENE HABER, of South Boston, in the county of Suffolk and State of Massachusetts, have invented certain new and useful Improvements in Rotary Cutter-Heads and Knives Therefor; and I hereby declare that the following is a full, clear, and exact description thereof, reference being had to the accompanying drawings, which form part of this specification.

This invention is an improvement in cutters for metal and wood-working machinery.

The objects of the invention are, first to provide cutters which can be turned into cutting position; second to hold these cutters in place so that the cutting edges will always have the desired position along the head without setting; third, to provide cutters with several cutting edges; fourth, to provide cutters with cutting ribs single or plural, straight or inclined, and fifth, to provide means of shifting the cutters with cutting ribs laterally.

In the preferred form of the invention the cutters are substantially round or cylindric in cross-section, and have several longitudinally disposed cutting edges, ground or milled thereon, so that by simply rotating the cutter on its axis any of the cutting edges can be brought to working position, and thus it is not necessary to remove and grind the cutter every time a cutting edge becomes dull.

The cutters may be used on stationary or rotary heads or supports, and may be rotated or reciprocated to cut the material, or the material may be moved relatively to the cutter.

The invention resides in the novel combination and construction of the cutters, the head or supports therefor, and the clamps for fastening the cutters in place as set forth in the claims.

The invention will be explained more fully in connection with the accompanying drawings, and the especial features and combinations of parts embraced in the invention and for which protection is desired are set forth in the claims.

Figure 1:
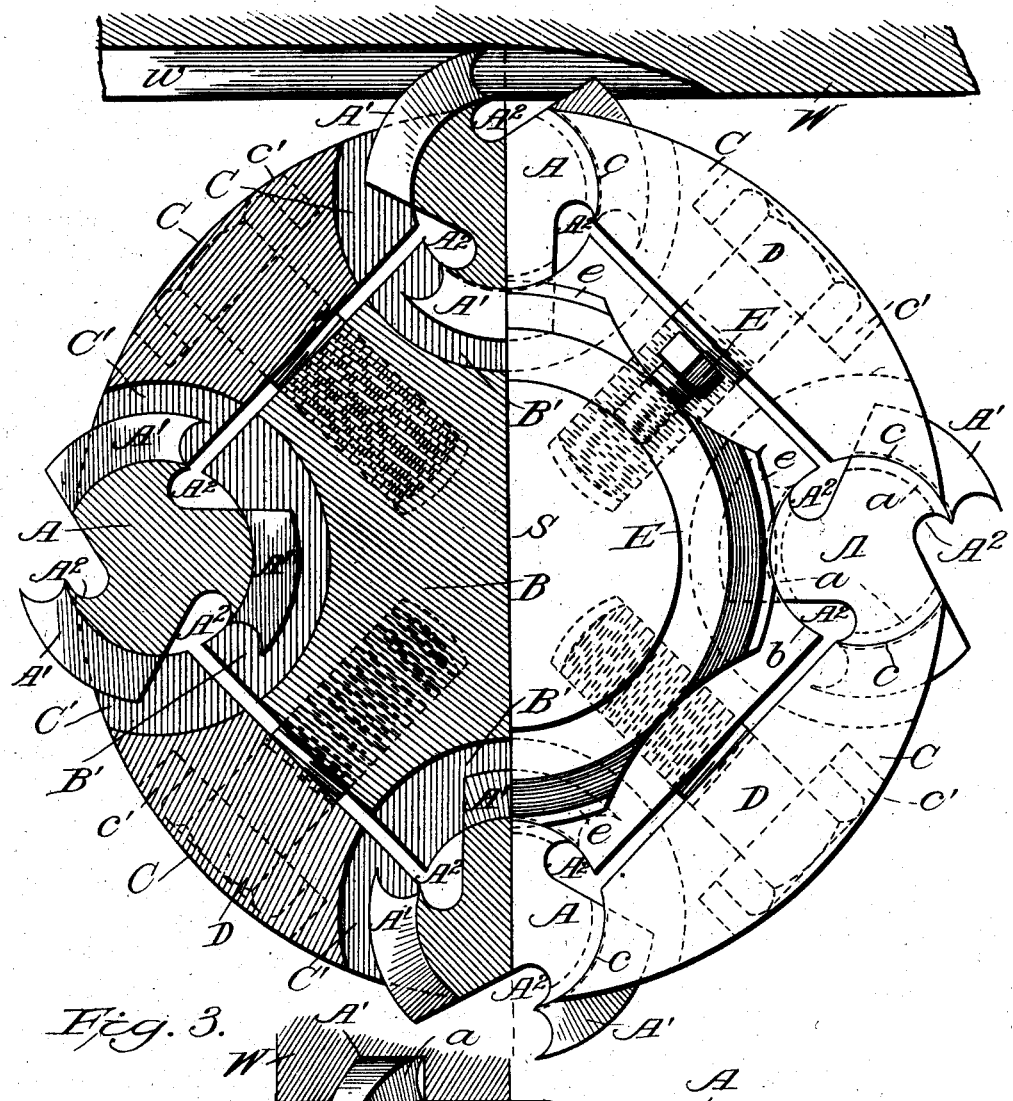
Figure 3:
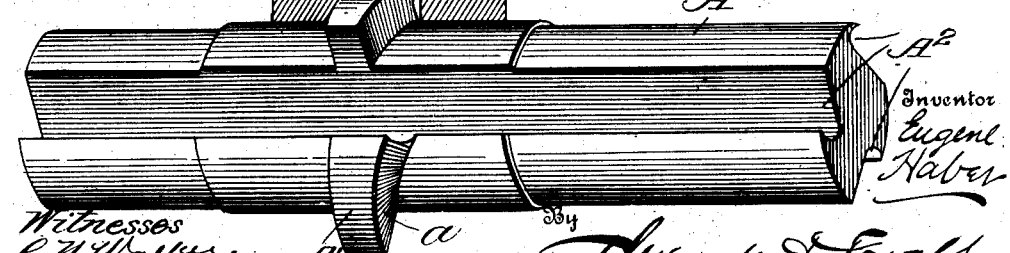

In the drawings—Figure 1 is a part transverse section, and part elevation, of a set of cutters attached to a cutter-head or adjustable support. Fig, 2 is a side view of Fig. 1. Fig. 3 is a detail view of one of the cutters, detached. Fig. 4 is a detail sectional view showing a set of planing cutters.

Each cutter A is preferably cylindric in cross-section, and provided with a plurality of cutting edges, which may be formed by longitudinally milling or grooving the periphery of the cutter as shown at $A^2$. The cutting edges are preferably equidistant.

The cutters are fitted in concave recesses $b$ in a support B, which may be a rotary-head, like those employed on wood and metal working machines, or may be merely an adjustable stationary tool-head such as are used on the same machines.

It will be noted that the cutters are eccentric to the axis of rotation of the head B, and to the cutting line. By simply turning the cutters on their own axis, any of their cutting edges can be adjusted to the cutting circle or line or line of work, said line or circle being eccentric to the axes of the cutters.

The cutters are adjustably secured in position on said support by means of clamps C which are provided with concaved side edges $c$, adapted to fit the convex surfaces of the cutter. The clamps are adjustably secured to the support B by bolts D, tapped into the support as shown in Fig. 1, the heads of the bolts being concealed, if desirable, in recesses $c'$ in the clamps.

As shown, the clamps C are adapted to retain two adjacent cutters in place, being of such a width that each edge of the clamps will engage a cutter, one edge of a clamp bearing on the leading side of one cutter, and the other edge of the clamp bearing on the trailing side of the preceding adjacent cutter.

With this novel construction of cutters, should a cutting edge become dull, the clamps may be loosened, the cutter rotated on its axis so as to bring a fresh cutting edge into working position, and the clamps tightened, without removing the cutter from the machine or having to re-sharpen the dulled edge, until all the cutting edges have been used. To turn these cutters a wrench can be engaged in the grooves of the cutters at one end thereof, and the cutter turned thereby.

The cutters as thus described, may be also provided, if desired, and as shown in Figs. 1, 2 and 3 with cutting ribs or projections $A'$ which will adapt the cutters for tonguing, and grooving, molding and other like work, either simultaneously with plane surfacing, or as a separate step. Providing the cutters with such projecting ribs does not necessitate any change in the support or clamps, other than providing them with suitable recesses to accommodate the projections,—and as shown in Figs. 1—3, the support B has recesses $B'$ to allow the rotative adjustment of the ribs $A'$ with the cutter; and the clamps C are provided with recesses $C'$ in the edges for the same purpose. These ribs $A'$ are fashioned to do the desired work, such as tonguing, grooving or molding work. As shown in Fig. 2, the ribs $A'$ are adapted to cut a tongue $w$, on the material W, and when placed on a rotary head as in Figs. 1 and 2 the ribs $A'$ on successive cutters should alternate, so as to operate respectively on opposite sides of the tongue;—thus, the uppermost cutter shown in Fig. 2 operates on the left-hand side of the material, while the preceding cutter (centrally shown in said figure) operates on the right-hand side of the material.

The cutting ribs $A'$ are preferably inclined or set at a slight angle to the plane of rotation, at least at their inner or working edges, as shown at a' for the purpose of obtaining "clearance" during the cutting operation. The ribs A' of course are not continuous around the cutter, and each rib on the cutter has approximately the same inclination as the other; but the ribs which operate, for example, on the right-hand side of the tongue or groove are inclined oppositely to the ribs which operate on the left-hand side of such tongue or groove.
As shown in Fig. 3 the ribs A' are shaped to cut a groove in the material W; and in this instance the alternate ribs on the cutter C are adapted to work opposite sides of the groove.

It is obvious that the ribs A' might be of any desired cross section; and also that the several ribs on any one cutter might be of different shapes or size (as indicated in Fig. 3) so that each rib could be used for a different effect,—thereby obtaining a variety of cutting knives in one cutter, but all for the same class of work; it only being necessary to rotate such a cutter on its axis to change the cut, and to bring the desired cutting rib into operation.

As shown in Figs. 1 and 2, a collar E is secured on the shaft S at one end of the head B. This collar E is secured by a set screw E' and has as many inclined ribs e on its periphery as there are cutters A in the head. Each rib e engages a correspondingly inclined groove a in the ends of the cutters A, which extend beyond the body B of the cutter-head at one side. The grooves a in the cutters are also inclined and have the same incline left or right, and are cut in the same angle, as the inclined sides a' of the cutting ribs A' on the cutters. There are three ways of using this collar.

First—the cutters and the collar E may be both stationary, in which case the ribs e and grooves a merely locate the cutters laterally. That is when the cutters are taken off and put on again (without grinding) the inclined cutting edges will have always the same position in the head.
Second—the cutters may be turned, while the collar is stationary. In this case the cutters (after grinding) have to be slightly turned relatively to their former position in the head in order to get the same cutting circle, and the grooves a and ribs e cause the cutter to shift laterally sufficiently to bring the cutting edges to proper position.

Third—If the collar is turned, all the cutters in the head can be properly shifted laterally, simultaneously, to the left or right so that the head will produce a thicker or thinner tongue or groove. This collar is only to be used with cutters having cutting ribs. When using straight cutters the collar E can be turned into such position that it will not interfere with the cutters. The collars may be graduated if desired, so that the extent of rotation thereof necessary to properly adjust the knives can be determined visually.

Obviously the cutters might be mounted in stationary bearings or supports, and the material moved therepast. This would be useful in adapting the invention as a tool-holder for wood and metal-working machinery.

Owing to the form of the cutters no knife-seats are necessary—the clamps fastening the cutters directly to the support; and as the cutters have a plurality of cutting edges, and intermediate recesses or grooves, they can be very securely held in position by the clamps.

Having thus described my invention what I claim as new and desire to secure by Letters Patent is:

1. In a cutter-head, the combination of a support, cutters having a plurality of inclined cutting portions and each rotatorily adjustable on its own axis; and adjustable clamps bearing on the surfaces of each two peripherally adjacent cutters.

2. In combination, a support, cutters having a plurality of peripheral cutting edges and rotatable on their axes to bring any cutting edge to operative position, and clamps adjustably attached to said body between and bearing upon peripherally adjacent cutters.

3. In combination, a support, cutters mounted on said support, and a collar at the end of the support, having ribs engaging the cutters, to adjust them axially of the head substantially as described.

4. In combination, a longitudinally grooved body, a cutter mounted in the groove of the body, and an adjustable collar at the end of the body having ribs engaging grooves in the cutter to adjust it axially of the head.

5. In combination, a longitudinally grooved body, cutters mounted in the grooves of the body, and each rotatorily adjustable on its own axis and an adjustable collar at the end of the body, provided with peripheral inclined ribs engaging inclined grooves in the cutters, to adjust them axially of the heads substantially as described.

6. In combination, a rotatable support, cutters mounted on said support each rotatorily adjustable on its own axis and provided with cutting ribs, and an adjustable collar beside the support provided with inclined ribs engaging inclined grooves in the cutters, to adjust them axially of the head, substantially as described.

7. In combination, a support, and a cutter mounted thereon having projecting cutting ribs; with a collar having a peripherally inclined rib engaging the cutter, to adjust it axially of the head substantially as described.

8. In combination, a rotatable support provided with grooves, cutters provided with peripheral cutting ribs and each rotatorily adjustable on its own axis; and means for clamping the cutters; with an adjustable collar having inclined ribs on its periphery engaging grooves in the cutters, to adjust them axially of the head substantially as described.

9. In combination, a support provided with longitudinal grooves or seats, cutters fitted in said grooves and each rotatorily adjustable on its own axis to bring their cutting edges into operative position, and clamps adjustably attached to said support and each bearing upon two of such cutters, substantially as described.

10. In combination, a rotatable support provided with longitudinal grooves or seats, cylindric cutters, each having a plurality of cutting edges, fitted in said grooves and each rotatorily adjustable on its own axis to bring any cutting edge into operative position, and clamps adjustably attached to said support between each pair of adjacent cutters and bearing upon both of such cutters, substantially as described.

11. In combination, a support provided with longitudinal grooves or seats, cylindric cutters having a plurality of radially projecting cutting ribs, and each rotatorily adjustable on its own axis to bring any cutting rib into operative position; and clamps adjustably attached to said support and each bearing upon two adjacent cutters.

12. In combination, a support provided with longitudinal grooves or seats, cylindric cutters having a plurality of longitudinal grooves and radially projecting inclined ribs, and each rotatorily adjustable on its own axis to bring any cutting rib into operative position; and clamps adjustably attached to said support and each bearing upon two adjacent cutters.

13. In a cutter head, the combination with a body, knives having longitudinal grooves forming longitudinal cutting edges, and clamps secured to the body between the knives and having their opposite edges engaging the two adjacent knives to secure them to the body.

14. In a cutter head, the combination of knives having longitudinal grooves forming longitudinal cutting edges, and clamps attached to the body and engaging the knives on both sides to secure the knives in place.

15. In combination, a support having concave knife-seats, cutters having convex surfaces adapted to fit the seats, and radially adjustable clamps secured to the support and simultaneously engaging by their opposite edges two peripherally adjacent cutters to fasten them in place.

16. In combination, a support, cutters fitted to the support and each rotatorily adjustable on its own axis, and each provided with a plurality of longitudinal cutting edges, and clamps secured to the support, each clamp having its edges concaved to bear upon the two adjacent cutters and secure them in place.

17. In combination with a cutter-head or support, having longitudinal grooves, longitudinal knives fitted in the grooves of said support, and each longitudinally grooved to form a plurality of cutting edges, each knife being rotatorily adjustable on its own axis to bring any cutting edge into operative position, and radially adjustable clamps secured to the head and having their opposite edges fitted to engage the two adjacent knives and hold them in place.

18. In a cutter head, the combination of peripheral grooved cutters located eccentric to the axis of the head, and means for clamping said cutters between the peripheral surface of one cutter and that of another and against the head.

19. The combination with the support, the rotatable cutters thereon, and clamps secured to the support between adjacent cutters, each clamp engaging two cutters, and each cutter being retained by two clamps on opposite sides thereof.

20. The combination with a cutter head, cutters located eccentric to the axis of the head, each cutter having a plurality of cutting edges, and a corresponding number of inclined cutting faces, said cutters being rotatable on their axis to bring any cutting edge with corresponding inclined cutting face to operative position, and means for clamping the cutters between their peripheral surfaces and against the head.

21. The combination with a cutter head, cutters located eccentric to the axis of the head, each cutter having a plurality of cutting edges, and a corresponding number of inclined cutting faces, said cutters being rotatable on their axis to bring any cutting edge with corresponding inclined cutting face to operative position, and clamps engaging two adjacent cutters to hold them in place.

22. In a cutter-head, the combination of a head, with cutters extending longitudinally of the head and located eccentric to the axis of the head parallel therewith, each cutter having a plurality of longitudinal cutting edges, and each rotatorily adjustable on its own axis to bring any of its edges to cutting position, and means for clamping the cutters laterally against the head.

In testimony that I claim the foregoing as my own, I affix my signature in presence of two witnesses.

EUGENE HABER.

In presence of—
ADRIAN B. SMITH,
WILLIAM L. DROHAN.